US010359930B2

(12) United States Patent
Adams

(10) Patent No.: US 10,359,930 B2
(45) Date of Patent: Jul. 23, 2019

(54) PORTABLE ELECTRONIC DEVICE INCLUDING PHYSICAL KEYBOARD AND METHOD OF CONTROLLING SELECTION OF INFORMATION

(71) Applicant: BlackBerry Limited, Waterloo (CA)

(72) Inventor: Neil Patrick Adams, Waterloo (CA)

(73) Assignee: BlackBerry Limited, Waterloo (CA)

( * ) Notice: Subject to any disclaimer, the term of this patent is extended or adjusted under 35 U.S.C. 154(b) by 248 days.

(21) Appl. No.: 15/413,221

(22) Filed: Jan. 23, 2017

(65) Prior Publication Data

US 2018/0210639 A1 Jul. 26, 2018

(51) Int. Cl.
| | |
|---|---|
| G06F 3/0484 | (2013.01) |
| G06F 3/0488 | (2013.01) |
| G06F 3/02 | (2006.01) |
| G06F 3/0482 | (2013.01) |

(52) U.S. Cl.
CPC ........ G06F 3/04883 (2013.01); G06F 3/0219 (2013.01); G06F 3/0482 (2013.01); G06F 3/0488 (2013.01); G06F 3/04842 (2013.01); G06F 3/04847 (2013.01); G06F 2203/04808 (2013.01)

(58) Field of Classification Search
CPC .................................................... G06F 3/0484
USPC ........................................................ 715/822
See application file for complete search history.

(56) References Cited

U.S. PATENT DOCUMENTS

| | | | |
|---|---|---|---|
| 8,650,507 B2 | 2/2014 | Westerman et al. | |
| 9,535,527 B2 * | 1/2017 | Ainalem | G06F 3/0412 |
| 2012/0113007 A1 * | 5/2012 | Koch | G06F 3/0488 |
| | | | 345/168 |
| 2012/0117506 A1 * | 5/2012 | Koch | G06F 3/04886 |
| | | | 715/773 |

(Continued)

FOREIGN PATENT DOCUMENTS

| | | |
|---|---|---|
| EP | 2778857 A1 | 9/2014 |
| EP | 2811386 A1 | 12/2014 |

OTHER PUBLICATIONS

European Patent Application No. 18150545.4, Extended European Search Report dated Jun. 15, 2018.

(Continued)

*Primary Examiner* — William D Titcomb
(74) *Attorney, Agent, or Firm* — Borden Ladner Gervais LLP; Geoffrey deKleine

(57) ABSTRACT

A method of controlling selection of information on an electronic device including a display and a physical keyboard. The method includes displaying the information on the display, displaying a first selection indicator identifying a start of the selection of information, and a second selection indicator identifying an end of the selection of information, and detecting a gesture on the physical keyboard. In response to detecting the gesture, an associated one of the first selection indicator and the second selection indicator is identified based on a location of the gesture on the physical keyboard. The associated one of the first selection indicator and the second selection indicator is moved within the information based on the gesture, to move the start or the end of the selection of information and adjust the amount of the information included in the selection of information.

18 Claims, 7 Drawing Sheets

(56) References Cited

U.S. PATENT DOCUMENTS

2014/0109016 A1* 4/2014 Ouyang .................. G06F 17/24
                                                    715/856
2015/0234799 A1* 8/2015 Cho .................... G06F 3/04842
                                                    715/708
2015/0378982 A1   12/2015 McKenzie et al.

OTHER PUBLICATIONS

Printout of "Walt's Thoughts", retrieved on Dec. 1, 2016 from http://www.richimages.net/?p=7010.

* cited by examiner

PORTABLE ELECTRONIC DEVICE INCLUDING PHYSICAL KEYBOARD AND METHOD OF CONTROLLING SELECTION OF INFORMATION

FIELD OF TECHNOLOGY

The present disclosure relates to electronic devices including physical keyboards.

BACKGROUND

Electronic devices, have gained widespread use and may provide a variety of functions including, for example, telephonic, electronic messaging and other personal information manager (PIM) application functions. Electronic devices include several types of devices including mobile stations such as simple cellular telephones, smart telephones, wireless PDAs, and computers.

Keyboards are particularly useful for user input to electronic devices. The information entered may be displayed on a display, such as a touch-sensitive display, and may be modified depending on the functions and operations being performed.

Improvements in electronic devices, including electronic devices with keyboards are desirable.

BRIEF DESCRIPTION OF THE DRAWINGS

Embodiments of the present disclosure will now be described, by way of example only, with reference to the attached figures, in which.

DETAILED DESCRIPTION

Figure 1:
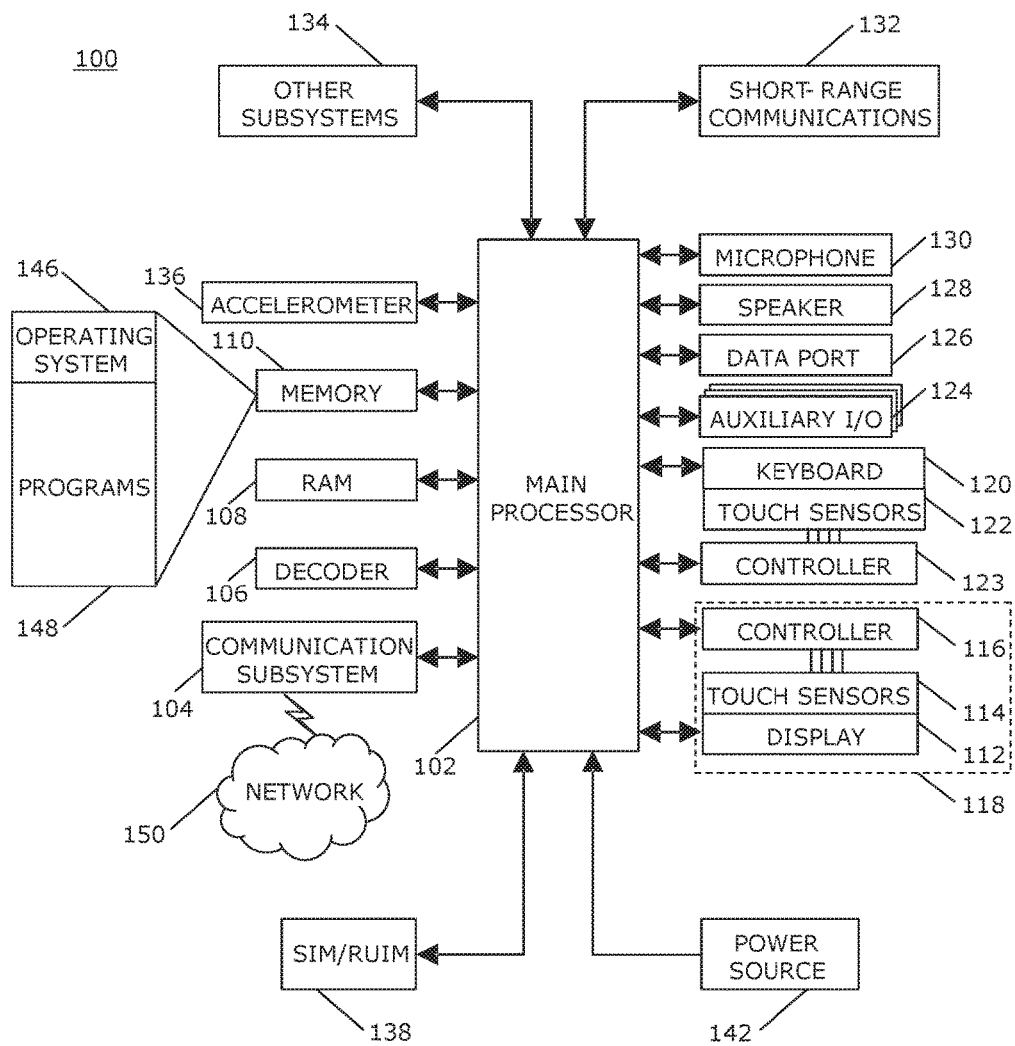
FIG. 1 is a block diagram of a portable electronic device in accordance with the present disclosure.

The following describes an electronic device including a display and a physical keyboard and a method of controlling selection of information on the electronic device. The method includes displaying the information on the display, displaying a first selection indicator identifying a start of the selection of information, and a second selection indicator identifying an end of the selection of information, and detecting a gesture on the physical keyboard. In response to detecting the gesture, an associated one of the first selection indicator and the second selection indicator is identified based on a location of the gesture on the physical keyboard. The associated one of the first selection indicator and the second selection indicator is moved within the information based on the gesture, to move the start or the end of the selection of information and adjust the amount of the information included in the selection of information.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device. Examples of electronic devices include mobile, or handheld, wireless communication devices such as cellular phones, cellular smart-phones, wireless organizers, personal digital assistants, computers, tablet computers, mobile internet devices, electronic navigation devices, and so forth.

A block diagram of one example of an electronic device 100, which in the present example is a portable electronic device, is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a keyboard 120, an auxiliary input/output (I/O) subsystem 124, a data port 126, a speaker 128, a microphone 130, short-range communications 132 and other device subsystems 134. The speaker 128, also referred to as an earpiece speaker, is utilized to output audible signals when a user's ear is very close to the speaker 128. Although not shown, the processor may also interact with a loudspeaker, for example, for handsfree use.

The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

The keyboard 120 includes a plurality of keys, which may be mechanical keys that include mechanical switches or contacts for input to the electronic device 100 when a mechanical key of the keyboard is depressed by a sufficient amount to oppose a bias of the mechanical key. In addition, the keys of the keyboard include touch sensors 122 coupled to a controller 123 to detect touch input thereon. The controller may be a keyboard controller 123 as illustrated in FIG. 1. Alternatively, the keys of the keyboard 120 may be coupled to the controller 116 utilized to detect touches using the touch sensors 114 of the touch-sensitive display 118.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

By repeatedly scanning the electrodes of the touch-sensitive display 118 to detect touches, movement of a touch relative to the touch-sensitive display 118 may be detected. One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch sensors 122 on the keyboard may be any suitable touch sensors, such as capacitive touch-sensors and may comprise any suitable material, such as indium tin oxide (ITO). Optionally, the touch sensors 122 disposed on the keyboard 120 may be coupled to the same controller 116 as the touch sensors of touch-sensitive display 118 such that a single controller is utilized rather than two controllers 116, 123.

One or more touches on the keys of the keyboard 120 may be detected. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the keyboard 120. A touch may be detected from any suitable input member and multiple simultaneous touches may be detected.

One or more gestures may also be detected utilizing the touch sensors 122 disposed on the keyboard 120. A gesture on the keys of the keyboard 120 may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover.

The touch-sensitive display 118 includes a display area in which information may be displayed, and a non-display area extending around the periphery of the display area. Information is not displayed in the non-display area by the display. The non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed in the non-display area. Touch sensors including drive electrodes and sense electrodes may be disposed in the non-display area, which touch sensors may be extended from the touch sensors in the display area or may be distinct or separate touch sensors from the touch sensors in the display area. A touch, including a gesture, may be associated with, i.e., performed on, the display area, the non-display area, or both areas. The touch sensors including the drive electrodes and the sense electrodes may extend across substantially the entire non-display area or may be disposed in only part of the non-display area.

Figure 2:
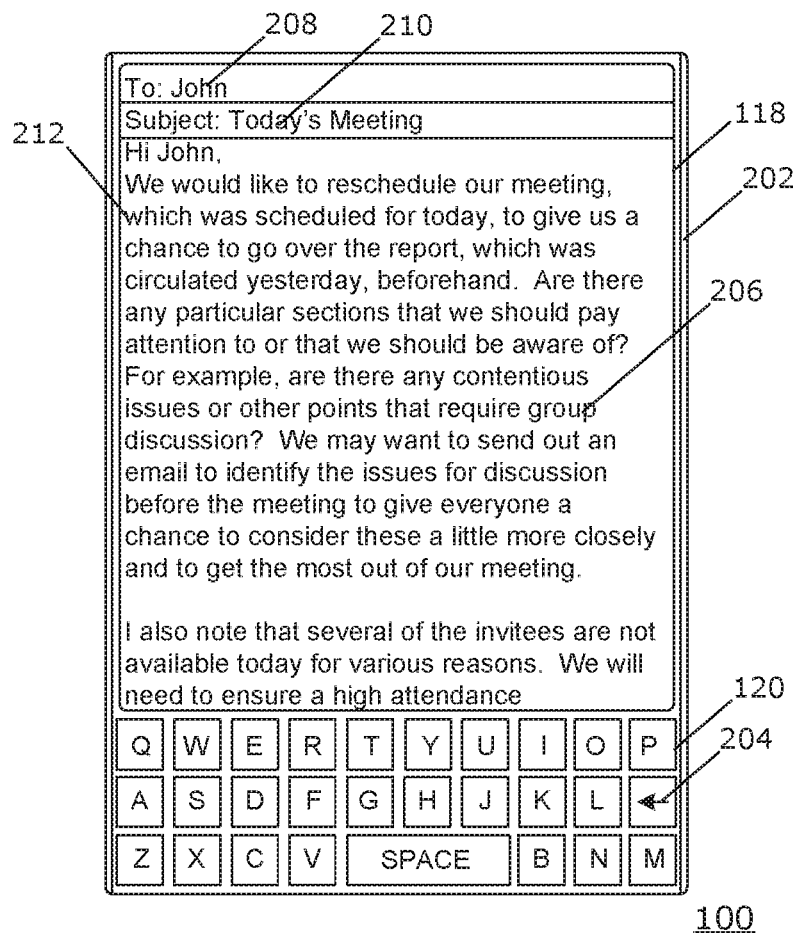
FIG. 2 is a front view of an example of a portable electronic device in accordance with the disclosure.

An example of an electronic device 100 is shown in FIG. 2. In the example of FIG. 2, the electronic device 100 includes a housing 202 in which the touch-sensitive display 118 is disposed. The housing 202 is utilized to enclose components such as the components shown in FIG. 1. The keyboard 120 is disposed below the touch-sensitive display 118 in the orientation illustrated in FIG. 2.

The mechanical keyboard 120 includes a plurality of keys 204. Each one of the keys 204 of the keyboard is associated with only a single, respective character such that only a single associated character is entered utilizing any one key 204. In the example shown in FIG. 2, each key is associated with a single character of the alphabet, a space, or a return function. Although the keyboard shown in FIG. 2 is a QWERTY keyboard, other keyboard layouts may be successfully implemented, such as an AZERTY keyboard, a QWERTZ keyboard, or any other suitable keyboard. The keyboard 120 in the present example, includes only three rows of keys 204 other numbers of rows of keys may be implemented, however. For example, a four row keyboard may be utilized.

For the purpose of the example of FIG. 2, information 206 is displayed on the touch-sensitive display 118. The information displayed may include any suitable information such as icons, text, pictures, video, documents, a webpage, or any other suitable information. The information may be associated with, for example, a home page, a menu or submenu, an application or applications, and so forth.

The information 206 in the example of FIG. 2 is a message, such as an email message displayed on the touch-sensitive display 118. The information 206 that is displayed is text that includes words or strings in sentences that are arranged in paragraphs. Part of the information may not be displayed. For example, the information may too long, or may be displayed at a font or character size that is too large to be displayed at one time on the touch-sensitive display 118. Additional information may be displayable, for example, by scrolling upwardly or downwardly to change the part of the information that is displayed.

The email message may be a message received or a message composed utilizing the portable electronic device 100. The information includes fields such as a recipient or "To:" field 208, a "Subject" field 210 and a message content field 212.

Figure 3:
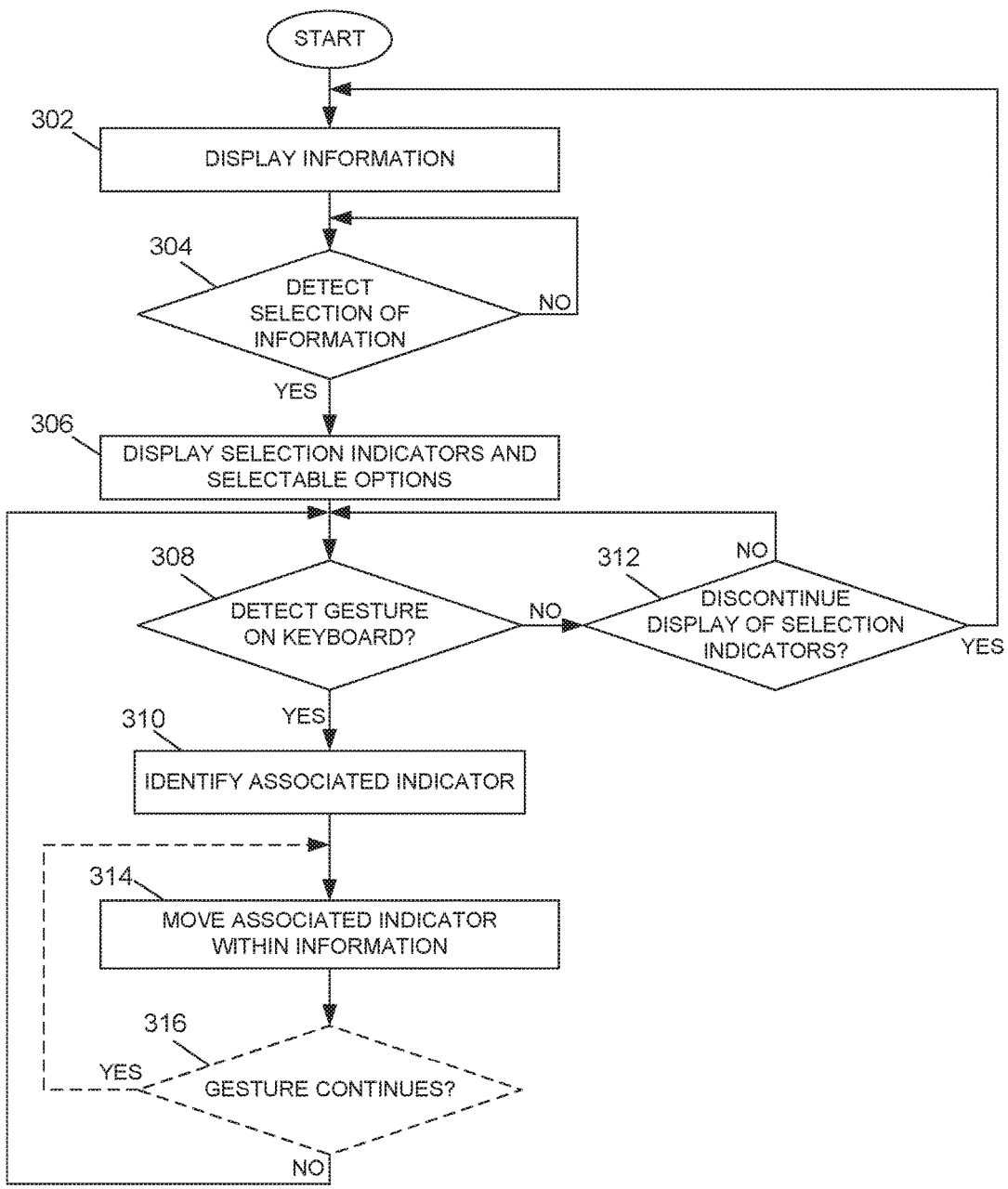
FIG. 3 is a flowchart illustrating a method of control of selection of information in accordance with the present disclosure.

A flowchart illustrating a method of controlling selection of information on a portable electronic device, such as the portable electronic device 100, is shown in FIG. 3. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor, such as the processor 102, of the portable electronic device to perform the method may be stored in a computer-readable storage medium, such as a non-transitory computer-readable medium.

Information is displayed 302 on the touch-sensitive display 118. The information may include text, characters, symbols, images, icons, and other items that may be displayed or rendered on a portable electronic device 100 in association with an application executed by the processor 102, such as, for example, an electronic mail, calendar, address book, word processor, Web browser, or any other suitable application.

In response to detecting an input to select part of the information at 304, the process continues at 306. In the example of the portable electronic device 100, the input may be a touch on the touch-sensitive display 118 that meets a touch criterion or criteria. The touch criteria may include a determination of whether or not the touch location is within the area in which the information is displayed and may include a comparison of contact time of the touch to a threshold period of time such that the touch meets the criteria when the touch contact meets the threshold period of time. Alternatively or in addition, the input may be a touch on the keyboard 120 that meets a touch criterion or criteria. The touch criteria may include one or more of touch location, a comparison of contact time to a threshold period such that the touch meets the criteria when the touch contact meets the threshold period of time, or may be a gesture or multi-touch on the keyboard 120, such as a tap, double tap, or two touches that overlap at least partially in time.

Optionally, the input to select part of the information may include a gesture in which two touches that begin very close to eachother, are moved away from eachother, also referred to as a reverse pinch or a pinch-to-zoom gesture. In response to receipt of the reverse pinch gesture at 304, the process continues at 306. In this example, the input to select part of the information is not time-dependent in that there is no threshold period of time that is met to continue at 306.

Alternatively, an input such as a gesture on the keyboard 120 may be received and, in response, the keyboard 120 may be utilized to control a cursor position on the display 112. A further gesture on the keyboard 120 may then be utilized to begin selecting part of the information. For example, the further gesture may be the reverse pinch gesture or any other suitable gesture, in response to which the process continues at 306. Thus, in this example, a first gesture is utilized to control the cursor position and a second gesture is utilized to begin selection.

Selection indicators are displayed in the information that is displayed on the display 112 at 306. The indicators may be any suitable shape to identify the start and end of the selected information. A first selection indicator is displayed at the start of the selected information and a second selection indicator is displayed at the end of the selected information. In addition, the part of the information that is selected may also be highlighted. In the example in which the input to select part of the information is a touch on the touch-sensitive display 118, the indicators are displayed in the information, at a location that is at or near the location at which the touch or touches are detected. For example, a string, such as a word or words, closest to the location of the touch on the touch-sensitive display 118 may be highlighted and the first selection indicator is displayed at the start of the selected information and the second selection indicator is displayed at the end of the selected information.

Along with the selection indicators, selectable options may also be displayed on the touch-sensitive display 118 at 306. The selectable options are functions that may include, for example, an option to copy the selected information. The selectable options may also include, for example, options to cut the selected information, or to paste over the selected information, or both cut and paste. The selectable options may be dependent on the information, also referred to as context-sensitive. For example the cut and paste options may not be available when information is selected from a received message. The cut and paste options may be available, however, when information is selected in a composed message that is not yet sent.

In response to detecting a gesture on the keyboard 120 at 308, the method continues at 310 and an associated one of the selection indicators is identified. When no gesture is received on the keyboard 120, a determination is made at 312 whether to continue displaying the selection indicators or to discontinue display of the selection indicators 312. For example, when no gesture is received and a key 204 of the keyboard 120 is depressed, display of the selection indicators may be discontinued. In this example, the part of the information that is selected and highlighted prior to receipt of the input from the key 204 of the keyboard 120 may be replaced with the information entered utilizing the key 204 of the keyboard 120. Display of the selection indicators is discontinued and the process continues at 302. Alternatively, display of the selection indicators may be discontinued when a touch is received on the touch-sensitive display 118, at a location associated with one of the selectable options, or with any other suitable function and not associated with the selection indicators.

In response to detecting the gesture on the keyboard 120 at 308, the method continues at 310 and an associated indicator is identified. The associated indicator may be identified at 310 based on the location at which the gesture begins. For example, a gesture that begins at a location on a first area of the keyboard 120 may be associated with one of the first selection indicator at the start of the selected information and the second selection indicator at the end of the selected information. A gesture that begins at a location on a second area of the keyboard 120 may be associated with the other one of the first selection indicator at the start of the selected information and the second selection indicator at the end of the selected information. The indicator that is identified at 310 may be displayed with attributes that differ from those attributes prior to identification of the indicator 310. For example, the color of the indicator may change, such as from black prior to identification to blue after identification. Alternatively, the indicator may flash or a circle or other element may be displayed around the indicator. Other attributes may also or alternatively change such that the indicator that is identified is also visually discernable.

Optionally, a multi-touch gesture may be associated with both the first selection indicator at the start of the selected information and the second selection indicator at the end of the selected information such that a first touch of the multi-touch gesture is associated with the first selection indicator at the start of the selected information and a second touch of the multi-touch gesture is associated with the second selection indicator at the end of the selected information.

The associated indicator or indicators are moved at 314 based on the gesture associated with the selection indicator. For example, the indicator may be moved based on the movement of the location of touch contact on the touch-sensitive display as the gesture progresses. Thus, in response to receipt of a gesture on the keyboard 120 to adjust the amount of information included in the selection, the location of the indicator is moved within the information to increase or decrease the amount of information included in the selection as the location of the touch on the keyboard 120 moves. Alternatively or in addition, the location of the indicator may be moved within the information to increase or decrease the amount of information included in the selection as the touch continues in time. Thus, as a hover, which is a touch at a location that is generally unchanged with time, continues, the location of the indicator may be moved within the information to increase or decrease the amount of information included in the selection. The amount of information may be incremented or decremented by a discrete amount, for example, by a word or by one line or one sentence at a time, in response to detecting the gesture. Other gestures may be utilized to increment or decrement the amount of information selected by other discrete amounts. For example, a hover may be utilized to move the indicator within the information by one word at a time. A double tap may be utilized to move the indicator within the information by one sentence at a time. Yet another gesture may be utilized to move the indicator within the information to a paragraph end or beginning. Thus, different gestures may be utilized to increment or decrement the amount of information selected by different discrete amounts.

In the event that the amount of the selected information exceeds the size of the area in which the information is displayed, the information may be scrolled such that a beginning part or an end part of the selection is scrolled off the display 112.

In response to determining that the gesture on the keyboard 120 to adjust the selection continues at 316, the method continues at 314. Thus, as the gesture on the keyboard 120 continues the method continues at 314. As the location of the gesture on the keyboard changes, i.e., the touch moves to a new location or touch contact is maintained, the method continues at 314. As the touch continues, the indicator may be continually adjusted to identify the adjusted selection.

The method continues at 308 such that the selection of information may be controlled by another keyboard gesture to adjust the selection at 310. Thus, a further gesture may be detected and, based on the further gesture, an associated indicator may be moved to select more information or to select less information. A gesture, multiple gestures are utilized to adjust the selection.

Figure 4:
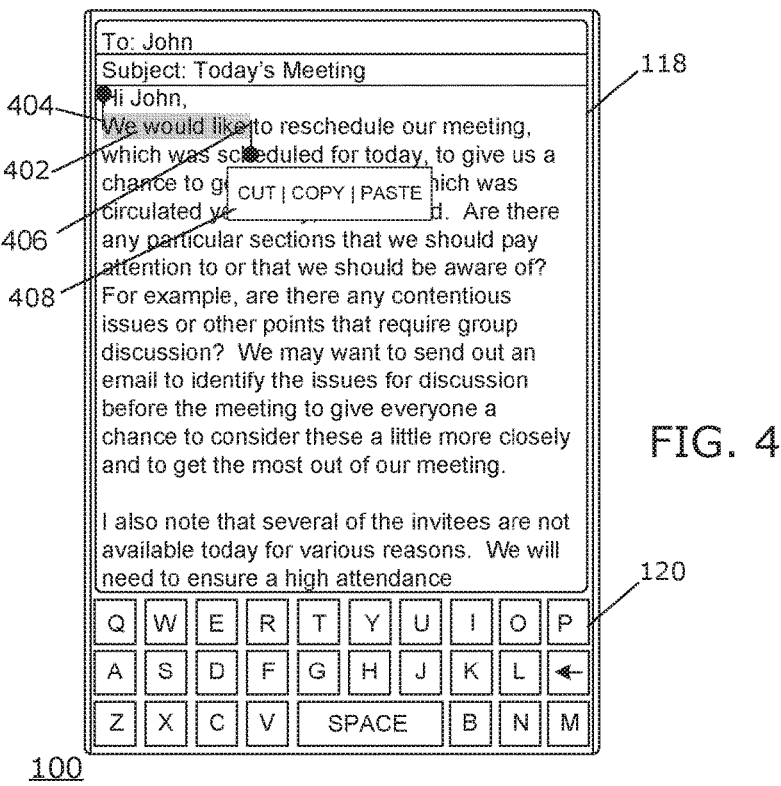
FIG. 4 through FIG. 11 illustrate examples of control of selection of information in accordance with the flowchart of FIG. 3.

Reference is made to FIG. 2 and FIG. 4 through FIG. 11 with continued reference to FIG. 3 to describe examples of the control of selection of information. For the purpose of the examples shown in FIG. 2, and FIG. 4 through FIG. 11, the information 204 is displayed at 302, as illustrated in FIG. 2 and described above. A touch is detected on the keyboard 120 of the portable electronic device 100 and the touch is maintained for a period of time that at least meets a threshold period of time at 304. A part of the information 204 is selected to provide the selection 402 and the selection indicators are displayed at 306, as illustrated in FIG. 4 by the first selection indicator 404 at the beginning of the selection 402 and the second selection indicator 406 at the end of the selection 402. The selected information is also highlighted in the examples described herein.

Thus, in the present example, the selection indicators that are displayed in the information 204 include the selection indicators 404, 406 and highlighting around the selected block of text. In the present example, the selection indicators 404, 406, also referred to as handles, include a line with a circle at one end, similar to a lollipop shape. The first selection indicator 404 includes the circle at the top of the line, generally above the selection 402 and the second selection indicator 406 includes a line with a circle at the bottom of the line, generally below the selection 402. The lollipop shaped selection indicators are utilized to facilitate identification of the start and end point of the selection and to adjust the selection. The terms above and below, up, down, right, and left are generally utilized herein to refer to the orientation in which the information is displayed and are not otherwise limiting.

Figure 5:
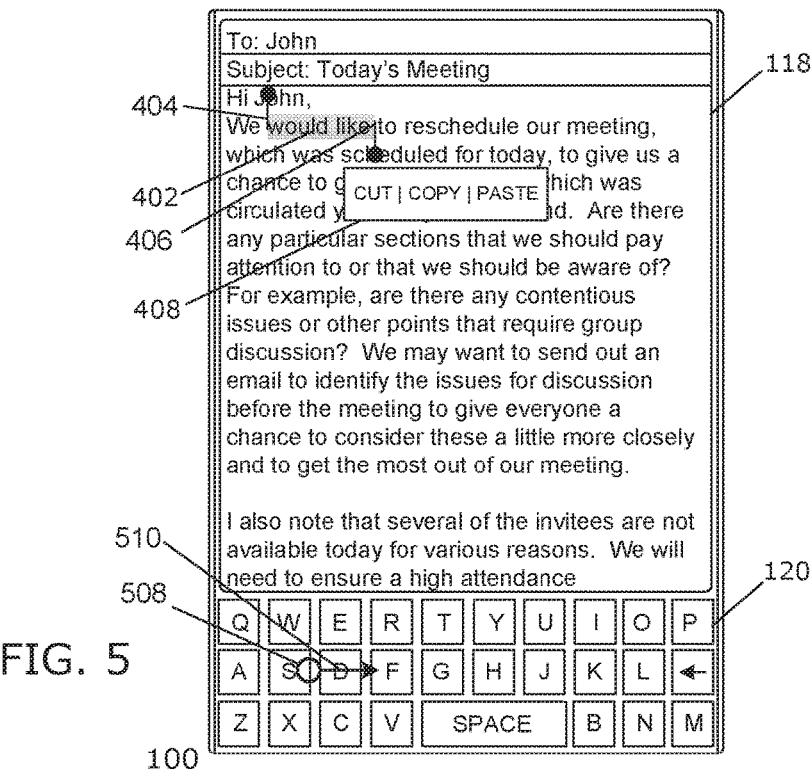

A gesture on the keyboard 120 is detected at 308 and the gesture is a gesture beginning on a left side of the keyboard 120. The location at which the gesture begins is represented by the circle 508 on the keyboard 120 and the path of the gesture is illustrated by the arrow 510. In this example, the gesture is associated with the first selection indicator 404 because the gesture begins on the left side of the keyboard 120. Thus, at 310, the first selection indicator 404 is identified as the indicator associated with the gesture. In response to detecting the gesture at 310, the first selection indicator 404 is moved at 314 to adjust the selection. Display of the first selection indicator 404 and display of the second selection indicator 406 continues, as illustrated in FIG. 5. The first selection indicator 404, however, is moved along with the gesture as the gesture progresses, and the selection 402 is adjusted as the amount of information selected changes. As illustrated in FIG. 4 and FIG. 5, the gesture moves from left to right and thus, the first selection indicator 404 moves from left to right and less information is selected.

In the example of FIG. 4 and FIG. 5, the selectable options 408, including cut, copy, and paste options are displayed. Although not shown in FIG. 6 though FIG. 11, similar or other suitable selectable options may be provided in each of the examples and may be displayed at any suitable location.

Figure 6:
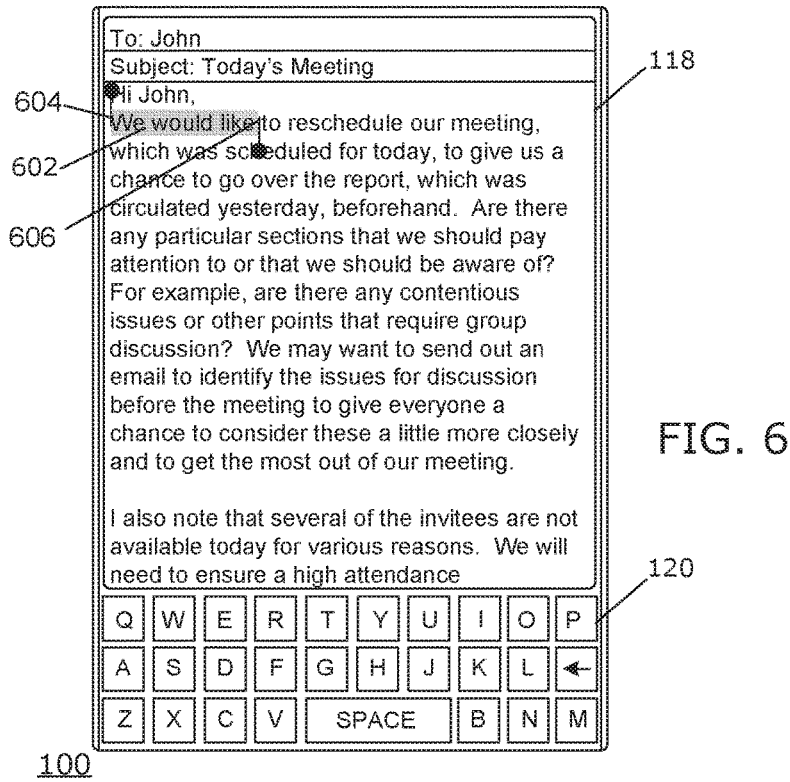
Figure 7:
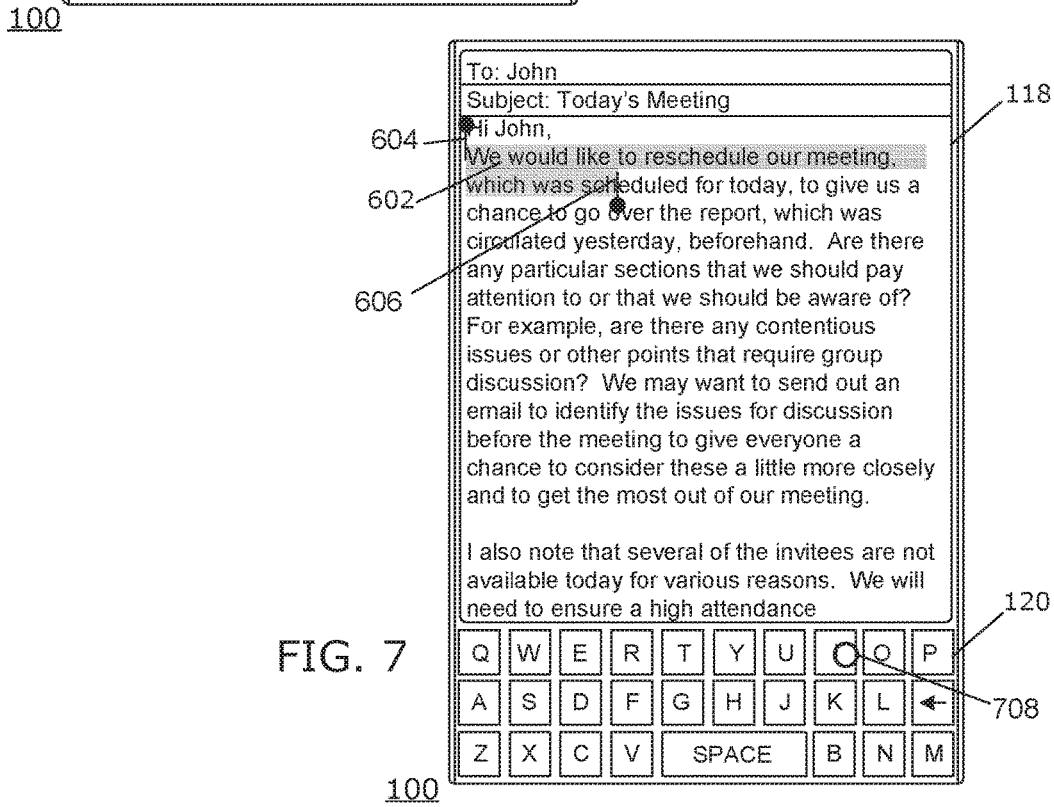

Reference is now made to FIG. 6 and FIG. 7 to describe another example. A touch is detected on the keyboard 120 of the portable electronic device 100 and the touch is maintained for a period of time that at least meets a threshold period of time at 304. A part of the information 204 is selected to provide the selection 602 and the selection indicators are displayed at 306, as illustrated in FIG. 6 by the first selection indicator 604 at the beginning of the selection 602 and the second selection indicator 606 at the end of the selection 602. The selected information is also highlighted in the examples described herein.

Thus, the selection indicators that are displayed in the information 204 include the selection indicators 604, 606 and highlighting around the selected block of text. In the present example, the selection indicators 604, 606, are also referred to as handles. The first selection indicator 604 includes the circle at the top of the line, generally above the selection 602 and the second selection indicator 606 includes a line with a circle at the bottom of the line, generally below the selection 602.

A gesture on the keyboard 120 is detected at 308 and the gesture is a gesture beginning on a right side of the keyboard 120. The location at which the gesture begins is represented by the circle 708. In this example, the gesture is a hover that begins at the location indicated by the circle 708 and the location is generally unchanged over a period of time that meets a threshold period of time. The gesture is associated with the second selection indicator 606 because the gesture begins on the right side of the keyboard 120. Thus, at 310, the second selection indicator 606 is identified as the indicator associated with the gesture. The second selection indicator 606 is moved within the displayed information at 314 to increment the amount of information selected by one line as the hover gesture continues at the location 708. The amount of information selected may be further incremented by maintaining the hover for a longer period of time. In the present example, the second selection indicator 606 is moved downwardly in the information as the gesture continues over time, and the selection is adjusted to change the endpoint of the selection, thereby changing the amount of information selected.

Figure 8:
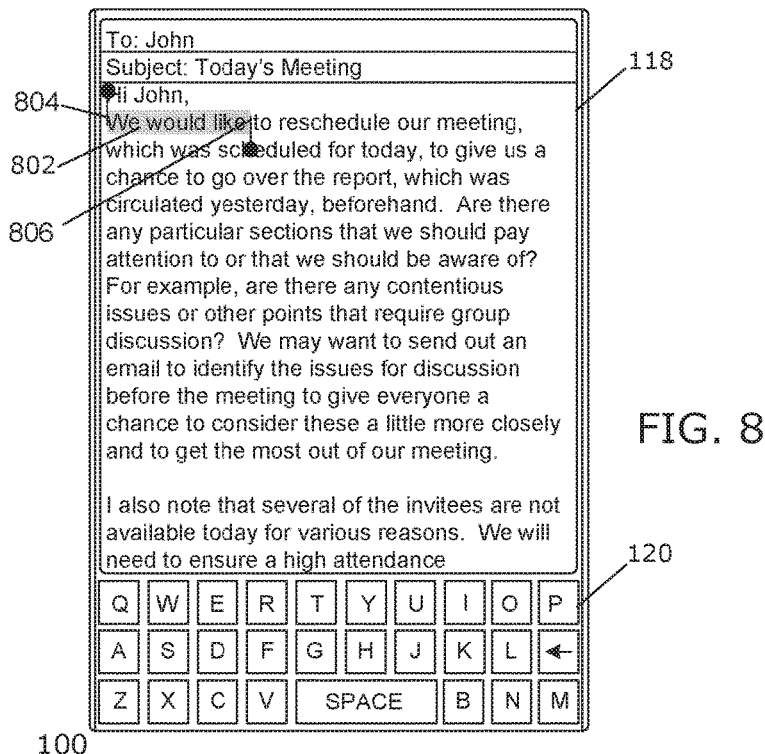
Figure 9:
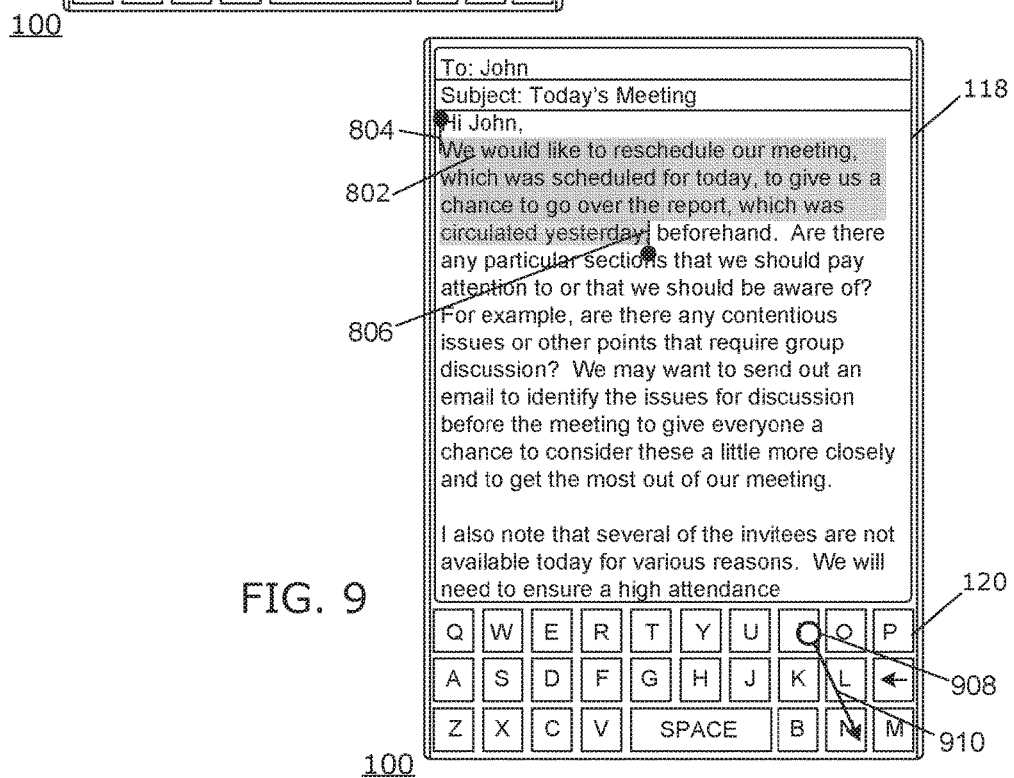

Referring now to FIG. 8 and FIG. 9 to describe another example, a touch is detected on the keyboard 120 of the portable electronic device 100 and the touch is maintained for a period of time that at least meets a threshold period of time at 304. A part of the information 204 is selected to provide the selection 802 and the selection indicators are displayed at 306, as illustrated in FIG. 8 by the first selection indicator 804 at the beginning of the selection 802 and the second selection indicator 806 at the end of the selection 802. The selected information is also highlighted in the examples described herein.

Thus, the selection indicators that are displayed in the information 204 include the selection indicators 804, 806, and highlighting around the selected block of text. In the present example, the selection indicators 804, 806 are also referred to as handles. The first selection indicator 804 includes the circle at the top of the line, generally above the selection 802 and the second selection indicator 806 includes a line with a circle at the bottom of the line, generally below the selection 802.

A gesture on the keyboard 120 is detected at 308 and the gesture is a gesture beginning on a right side of the keyboard 120. The location at which the gesture begins is represented by the circle 908. In this example, the gesture, which begins at the location indicated by the circle 908, moves downwardly and to the right. The gesture is associated with the second selection indicator 806 because the gesture begins on the right side of the keyboard 120. Thus, at 310, the second selection indicator 806 is identified as the indicator associated with the gesture. The second selection indicator 806 is moved within the displayed information at 314 as the gesture continues. In the present example, the second selection indicator 806 is moved downwardly and to the right in the information as the gesture continues with the location of touch contact moving downwardly and to the right. Thus, the selection is adjusted and the amount of information that is selected changes.

Figure 10:
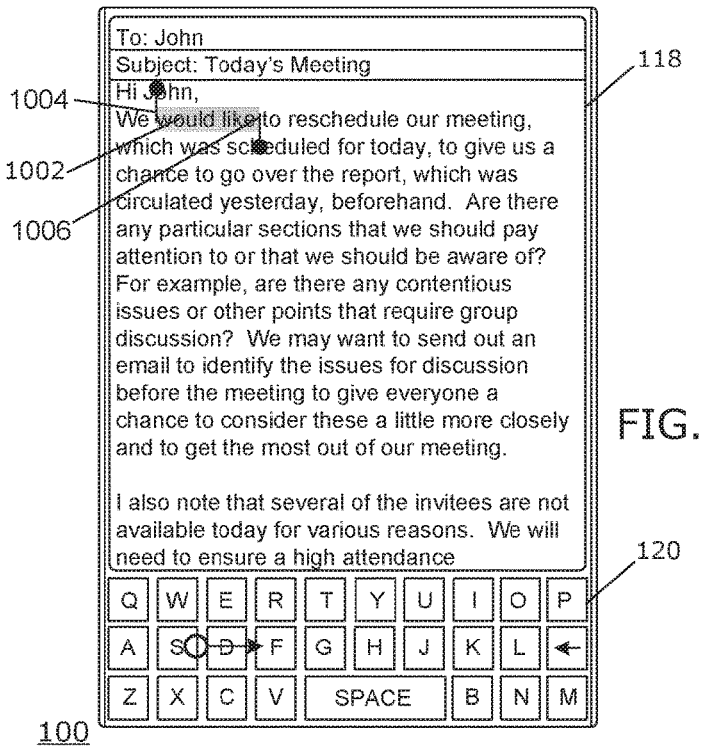
Figure 11:
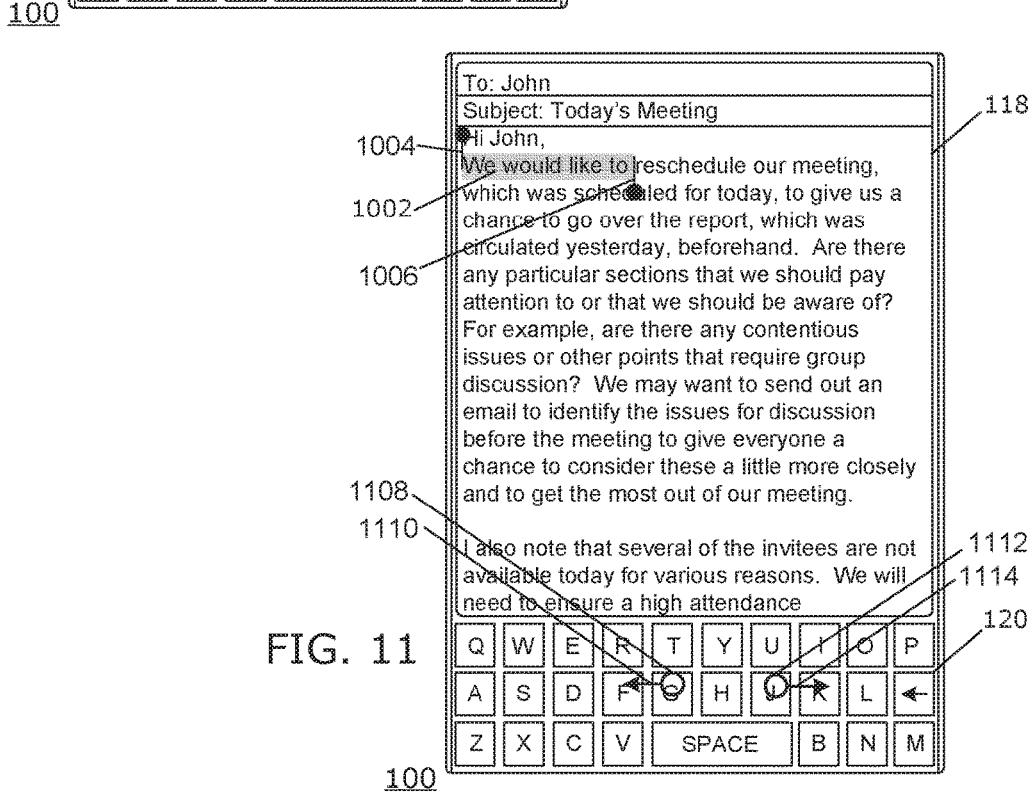

Referring now to FIG. 10 and FIG. 11 to describe yet another example, a touch is detected on the keyboard 120 of the portable electronic device 100 and the touch is maintained for a period of time that at least meets a threshold period of time at 304. A part of the information 204 is selected, resulting in the selection 1002 and the selection indicators are displayed at 306, as illustrated in FIG. 10 by the first selection indicator 1004 at the beginning of the selection 1002 and the second selection indicator 1006 at the end of the selection 1002. The selected information is also highlighted in the examples described herein.

Thus, the selection indicators that are displayed in the information 204 includes the selection indicators 1004, 1006, and highlighting around the selected block of text. In the present example, the selection indicators 1004, 1006, are also referred to as handles. The first selection indicator 1004 includes the circle at the top of the line, generally above the selection 1002 and the second selection indicator 1006 includes a line with a circle at the bottom of the line, generally below the selection 1002. Other shapes or geometries of selection indicators may be successfully implemented.

A gesture on the keyboard 120 is detected at 308 and the gesture is a multi-touch gesture beginning at one touch location on left side of the keyboard 120, at the location represented by the circle 1108, and at another touch location on the right side of the keyboard 120, at the location represented by the circle 1112. The two touches begin at or near the same time and overlap in time. In this example, the gesture, which begins at the locations indicated by the circle 1108 and the circle 1112, is a gesture in which the two touch locations are moved away from eachother, also referred to as a reverse pinch or a pinch-to-zoom gesture. The gesture is associated with both the first selection indicator 1004 and the second selection indicator 1006 because the gesture begins on both sides of the keyboard. In the present example, the touch on the left side of the keyboard is associated with the first selection indicator 1004 and the touch on the right side of the keyboard 120 is associated with the second selection indicator 1006. Thus, at 310, both the first selection indicator 1004 and the second selection indicator 1004 are identified as associated with the gesture. The first selection indicator 1004 is moved within the displayed information and the second selection indicator 1006 is moved within the displayed information at 314 as the gesture continues. In the present example, the first selection indicator 1004 is moved to the left as the touch that started at the location 1108 moves to the left, while the second selection indicator 1006 is moved to the right as the touch that started at the location 1112 moves to the right. Thus, the selection is adjusted as the amount of information selected changes.

In each example, a further gesture may be received to select more information or less information. In addition, the indicators that identify the start and the end of the selection may also be adjusted, or moved within the information, by a touch or gesture on the touch-sensitive display.

Advantageously, selection of information may be activated and the selection may be adjusted to increase or decrease the amount of information selected utilizing the touch-sensors of the keyboard 120. Thus, the keyboard 120 is utilized for fine text selection control. The hand or fingers of the user are therefore displaced from the display, facilitating viewing of the display and the selected information during fine control of the indicators that identify the start and the end of the selection.

The scope of the claims should not be limited by the preferred embodiments set forth in the examples, but should be given the broadest interpretation consistent with the description as a whole.

What is claimed is:

1. A method of controlling selection of information on an electronic device including a display and a physical keyboard, the physical keyboard including touch sensors coupled to a controller to detect touch input thereon, the method comprising:
    displaying the information on the display;
    displaying both a first selection indicator identifying a start of the selection of information, and a second selection indicator identifying an end of the selection of information such that the selection of information is displayed between the first selection indicator and the second selection indicator;
    detecting a gesture on the physical keyboard;
    in response to detecting the gesture:
        identifying which of the first selection indicator and the second selection indicator is associated with the gesture based on a start location of the gesture on the physical keyboard; and
        moving the associated one of the first selection indicator and the second selection indicator within the information based on the gesture, to move the start or the end of the selection of information and adjust the amount of the information included in the selection of information.

2. The method according to claim 1, comprising detecting an input on the keyboard of the electronic device and wherein the first selection indicator and the second selection indicator are displayed in response to detecting the input on the keyboard.

3. The method according to claim 2, wherein the input comprises a multitouch gesture on the keyboard of the electronic device.

4. The method according to claim 1, wherein the gesture comprises a moving touch and the associated one of the first selection indicator and the second selection indicator is moved in a direction based on a direction of movement of the touch.

5. The method according to claim 4, wherein a distance of movement of the one of the first selection indicator and the second selection indicator is based on a distance of movement of the gesture on the keyboard.

6. The method according to claim 4, wherein the one of the first selection indicator and the second selection indicator is moved by an amount to increment or decrement the amount of information by a discrete amount.

7. The method according to claim 1, wherein the first selection indicator is identified in response to detecting the gesture on a first part of the keyboard and the second selection indicator is identified in response to detecting the gesture on a second part of the keyboard.

8. The method according to claim 7, wherein the first part of the keyboard is on a first half of the keyboard and the second part of the keyboard is on a second half of the keyboard.

9. The method according to claim 1, comprising discontinuing displaying the first selection indicator and the second selection indicator in response to receiving an input not associated with the selection.

10. The method according to claim 1, wherein the gesture comprises a touch maintained at a location on the keyboard and wherein the associated one of the first selection indicator and the second selection indicator is moved in response to touch contact being maintained for a threshold period of time.

11. The method according to claim 1, comprising displaying selectable options along with the first selection indicator and the second selection indicator.

12. A non-transitory computer-readable medium having computer-readable code stored thereon, the computer-readable code executable by at least one processor of a portable electronic device to:
    display information on the display;
    display both a first selection indicator identifying a start of a selection of information, and a second selection indicator identifying an end of the selection of information such that the selection of information is displayed between the first selection indicator and the second selection indicator;
    detect a gesture on a physical keyboard;
    in response to detecting the gesture:
        identify which of the first selection indicator and the second selection indicator is associated with the gesture based on a start location of the gesture on the physical keyboard; and
        move the associated one of the first selection indicator and the second selection indicator within the information based on the gesture, to move the start or the end of the selection of information and adjust the amount of the information included in the selection of information.

13. An electronic device comprising:
    a display for displaying information;
    a physical keyboard including touch sensors for detecting a touch thereon; and
    a processor operably coupled to the display and to the keyboard to control the display and the keyboard to:
        display both a first selection indicator identifying a start of a selection of the information, and a second selection indicator identifying an end of the selection of the information such that the selection of information is displayed between the first selection indicator and the second selection indicator;
        detect a gesture on the physical keyboard;
        in response to detecting the gesture:
            identify which of the first selection indicator and the second selection indicator is associated with the gesture based on a start location of the gesture on the physical keyboard; and
            move the associated one of the first selection indicator and the second selection indicator within the information based on the gesture, to move the start or the end of the selection and adjust the amount of the information included in the selection.

14. The electronic device according to claim 13, wherein the first selection indicator and the second selection indicator are displayed in response to detecting an input on the keyboard.

15. The electronic device according to claim 13, wherein the gesture comprises a moving touch and the associated one of the first selection indicator and the second selection indicator is moved in a direction based on a direction of movement of the touch.

16. The electronic device according to claim 15, wherein a distance of movement of the one of the first selection indicator and the second selection indicator is based on a distance of movement of the gesture on the keyboard.

17. The electronic device according to claim 15, wherein the one of the first selection indicator and the second selection indicator is moved by an amount to increment or decrement the amount of information by a discrete amount.

18. The electronic device according to claim 13, wherein the first selection indicator is identified in response to detecting the gesture on a first part of the keyboard and the second selection indicator is identified in response to detecting the gesture on a second part of the keyboard.

* * * * *